Oct. 1, 1957 — L. C. HUFF — 2,808,319
VESSEL OUTLET
Filed June 17, 1955
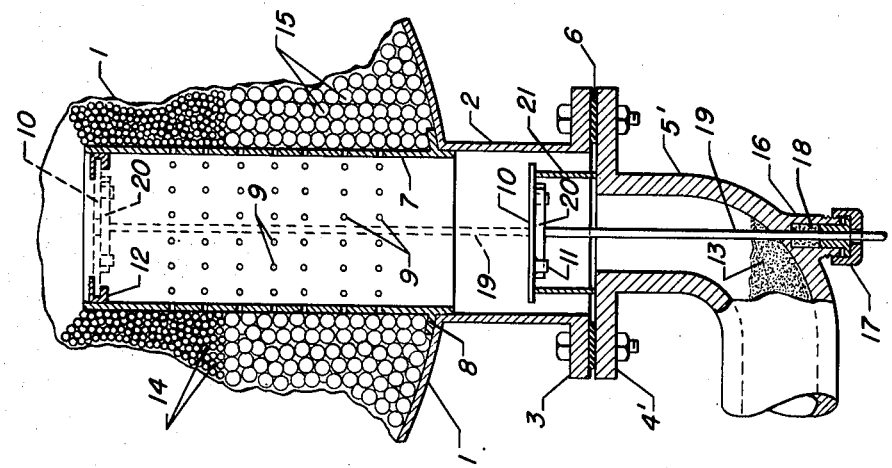
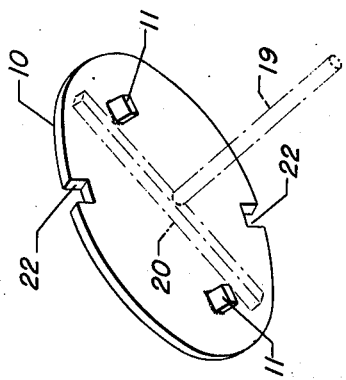
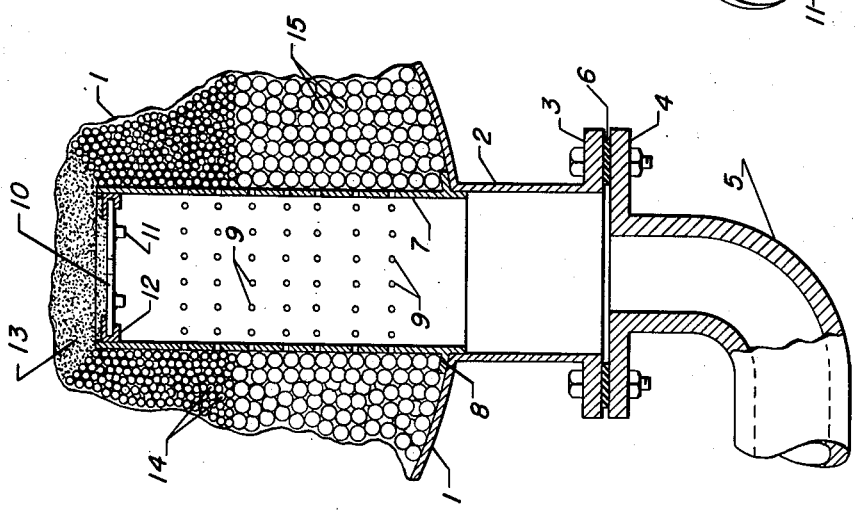
INVENTOR:
Lyman C. Huff.
By:
Chester J. Giuliani
ATTORNEY:
Glen R. Grunewald
AGENT:

United States Patent Office 2,808,319
Patented Oct. 1, 1957

2,808,319

VESSEL OUTLET

Lyman C. Huff, Evanston, Ill., assignor to Universal Oil Products Company, Des Plaines, Ill., a corporation of Delaware Application June 17, 1955, Serial No. 516,231

2 Claims. (Cl. 23—284)

This invention relates to a vessel outlet and particularly to an outlet assembly for use in a vessel containing a bed of solid particles.

It is frequently desirable to treat a fluid stream with a bed of solid particles contained in a vessel. Vessels are generally sealed from the atmosphere and contain the solid material in a bed which is restricted from flowing out of the vessel by a screen assembly which is disposed in the lower portion thereof. Typical of such processes are catalyzed reactions wherein a fluid stream is passed into contact with a bed of catalyst particles at conditions to effect the desired reactions. Other processes such as contacting a fluid stream with an ion exchange material to purify it by removing an undesirable impurity therefrom or leeching solid particles to remove a soluble component therefrom may also employ a bed of solid particles treated with flowing fluid stream.

The best way to effect such a contact is to pass the fluid downwardly through a fixed bed of the contact material when such a contacting method is practical in light of the process to be effected. Passing the fluid upwardly through the bed causes large pressure drops and fluidization of the bed or maintaining each particle in a state of hindered settling so that there is transportation of particles from the bottom to the top of the bed and vice versa. The most serious drawback to a fluidized or fixed fluidized bed is that large pressure drops are encountered to force the fluid material through the bed. When employing moving beds such as suspensoid operations or descending dense phase beds, the problems encountered in such moving solid particle methods are so great that only the severest of operating difficulties will allow for their use.

This invention is directed towards a method of maintaining a packed fixed bed of particles in a vessel with a contacting fluid flowing downwardly therethrough. As in other processes of this nature, the bed of solid material is preferably maintained in the vessel by a screen assembly in the lower portion thereof, which screen assembly prevents the solid particles from passing from the vessel but allows the fluid reaction products to discharge from the vessel. Since it is desirable that small particles be used to obtain optimum contact of the fluid with the solid, it is necessary either to have a screen with small openings which become readily clogged with the small particles or to dispose inert solid material having suitable dimensions in the vicinity of the screen to shield it from the contact material. To effect this end it is a common practice to fill the lower portion of such a vessel with inert ceramic balls of varying sizes, generally of from about ¼ inch diameter to about 1 inch diameter, which ceramic balls due to their spherical shape, resistance to breakage and their large dimensions, bridge against each other so that the openings to the screen are in the open spaces of the bed of balls to a very large extent and therefore free for withdrawing fluid from the reaction vessel. Very frequently the bottom portion of a reaction vessel will be filled partially with large diameter balls and partially with small diameter balls so that the particulated contact material will not enter the larger interstices between the larger balls thereby having a two-stage filtering effect, in the first stage having the small balls maintaining the contact particles from discharging from the bottom of the vessel and in the second stage having the large balls maintaining the small balls from descending to the bottom of the vessel.

The use of inert solid spheres as hereinbefore described is widely and very successfully practiced, however in most contacting processes the solid contact material having the specific characteristics for which the fluid is passed therethrough, becomes spent after a given period in operation. For example catalytic material may become poisoned with impurities or covered with coke or carbonaceous solids which shield the catalytic surfaces from contact with the fluid after which the catalyst loses its reaction promoting ability and must either be regenerated or replaced. Similarly, an ion exchange material may become saturated and a material which is being leeched may become exhausted of the desirable extractable component. Whenever the time comes to discharge the contact material from the vessel it is necessary to remove the balls as well as the contact material, even though the balls are perfectly good and capable of a substantially greater period of use in the vessel. In order to be used again the balls must be separated from the contact material and from each other if different sizes are used and then they must be recharged to the vessel before an additional charge of contact material may be added. It is an object of this invention to provide a unique outlet assembly for such a reaction vessel which provides for removing the contact material but to keep the balls in contact with the screen so that they need not be discharged and readded to the vessel.

In one embodiment this invention relates to a vessel outlet solid seal comprising in combination a vertical perforated solids retaining member adapted to form a seal with the vessel outlet and to extend vertically into the interior of said vessel with removable means forming a top closure for said retaining member.

In another embodiment this invention relates to a vessel closure assembly comprising in combination a solids seal assembly comprising a vertical perforated solids retaining member adapted to form a seal with the vessel outlet and to extend vertically into the interior of said vessel with removable means forming a top closure for said retaining member and conduit means attached to said outlet adapted with means for removing said top closure of said perforate retaining member.

Briefly, this invention provides a vessel outlet for the bottom portion of a vessel containing a bed of packed particles which outlet assembly contains a removable topped screen member with exterior means connected to the outlet conduit for removing the removable top thereby allowing the contact material in the vessel to be discharged through the outlet conduit without disturbing the shielding balls maintained in the bottom of the vessel around the screen member.

The invention can be better described with reference to the accompanying drawings which indicate in Figure 1 the outlet assembly of this invention as it appears in use during the contacting of the solid particulate material with the fluid stream. Figure 2 shows the vessel outlet after the period of contacting with fluid and during the removal of the contact material without disturbing the position of the balls. Figure 3 shows one embodiment of the removable top closure for the screen assembly which may be employed.

Referring to Figure 1 vessel or shell 1 is connected to outlet 2 having flange 3 for forming a seal to the atmosphere with flange 4 of outlet conduit 5. Gaskets 6 may be employed to further promote sealing the vessel and these may be any suitable gaskets or machined iron rings that are adapted to withstand the pressure requirements of the vessel. Screen member 7 is made with flared section 8 and adapted to form a seal with outlet 2 of the vessel and to rest thereupon with the upper portion of screen member 7 extending into the interior of the vessel and in this embodiment axial therewith. Screen member 7 in this embodiment is shown as a perforated plate containing holes 9, however, it may be a woven wire screen or any other suitable means for retaining solid particles and passing fluids. The screen member 7 is closed on top with closure 10 having attached thereto lugs 11 and being slotted and adapted to movably fit into holding means 12.

In operation as pictured in this embodiment, a fluid stream is contacted with the particles of contact material 13 maintained above screen member 7. The particles of contact material are prevented from surrounding the screen member and particularly from closing perforations 9 by being disposed on a bed of small balls 14 which surround the upper portion of the screen member 7. When desired small balls 14 may be supported on a bed of large balls 15 which surround the lower portion of the screen member and keep both the small balls and the contact material from descending to the bottom of vessel 1. As hereinbefore stated it may readily be seen that the perforations of screen member 7 which are surrounded by large balls 15 are more readily available for the passage of fluid therethrough than are the perforations surrounded by small balls 14.

Therefore the fluid stream descending through vessel 1 and passing downwardly through the contact material enters the zone of small balls and large balls, passes through perforations 9 into the interior of screen member 7 and out of vessel 1 through outlet 2 and conduit 5 to further processing. After contact material 13 becomes spent, it is desirable to remove it from the vessel and this may be done with the assembly of the present invention without disturbing the manner in which the screen and balls are disposed in the vessel interior.

Referring to Figure 2, it may be seen that vessel 1, outlet 2 thereof and flange 3 remain as during in operation, however, in this embodiment, conduit 5' attached to the vessel with flange 4' is interchanged for conduit 5 of Figure 1. Conduit 5' has attached thereto a packing gland 16 which, through compression nut 17 and suitable machined adaptors maintain packing 18 in a state of compression thereby preventing leakage of fluid around the rod 19 of the wrench. The wrench member 20 on top of rod 19 and attached thereto is adapted to engage lugs 11 of removable plate 10, and impart a twisting motion to it so that it becomes disengaged from retaining means 12 at the upper end of the screen assembly 7. As pictured in Figure 2 the top closure 10 of screen member 7 has been removed and the contact material 13 has been discharged from the vessel and is flowing through conduit 5' to be discharged. It may be noted that clips 21 are attached to flange 4' to maintain top closure 10 from sealing the mouth of conduit 5' and these may be of any suitable shape or size.

The broken line representation in the interior of screen assembly 7 indicates the position of rod 19 and wrench member 20 prior to discharging contact material 13 from the vessel. It may be noted that rod 19 is extended through packing gland 16 until it engages top closure member 10 and is turned against lugs 11 until top closure member 10 is disengaged from holding means 12 connected to the upper portion of assembly 7. The top closure means may then be lowered until it comes to rest on supports 21 and the contact material passes through the screen member and out conduit 5' however, small balls 14 and large balls 15 as well as the screen assembly 7 remain undisturbed, the only material passing from the reaction vessel being the spent contact material.

Figure 3 shows an isometric view of one suitable embodiment of top closure member 10. It may be noted here that slots 22 are cut out of the periphery of top closure member 10 so that it may engage holding means 12, be turned a few degrees and be locked securely in place. The wrench member 20 is adapted to engage lugs 15 shown in this embodiment as welded onto the disc like top closure member 10. Figure 3 shows merely one simple means of effecting a top closure for this assembly and may include as modifications thereof the adaptation of more slots 22 or different shaped slots 22 to engage holding member 12. Many other modifications of the apparatus may be made within the broad scope of this invention including disposing top closure 10 on top of screen member 7 so that the contact material may be discharged merely by lifting the top closure member 10 with any suitable means such as rod 19 and wrench 20. Other modifications include actuating rod 19 and wrench 20 with a suitable mechanism or hydraulic mechanism to lift top closure 10 when such is desired or to hinge top closure member 10 to one side of the screen assembly and employ rod 19 merely as an unlocking means.

The apparatus of this invention may also be employed with only one outlet conduit rather than interchangeable conduits, the single outlet conduit being modified or adapted so that rod 19 contains a seating member machined thereon which will form a pressure seal with the interior of conduit 5' so that during operation packing 18 will be under substantially atmospheric pressure. As hereinbefore stated the drawings and description herein are intended merely to illustrate one embodiment of the broad concept of this invention and are not intended to limit this invention to the particular mode of operation or contours of the apparatus herein shown.

I claim as my invention:

1. In a contacting chamber adapted to contain a bed of particulated solid contact material and having an outlet in the bottom thereof, the combination of a cylindrical perforated solids retaining member forming a seal with said outlet and extending vertically into the interior of the chamber, a bed of inert solid spherical members surrounding said perforated retaining member in the lower portion of the chamber for supporting said contact material in the chamber above the retaining member, said spherical members being larger than the perforations in the retaining member, and a removable top closure for said retaining member.

2. In a contacting chamber adapted to contain a bed of particulated solid contact material and having an outlet in the bottom thereof, the combination of a cylindrical perforated solids retaining member forming a seal with said outlet and extending vertically into the interior of the chamber, a bed of inert solid spherical members surrounding said perforated retaining member in the lower portion of the chamber for supporting said contact material in the chamber above the retaining member, said spherical members being larger than the perforations in the retaining member, a removable top closure for said retaining member adapted to drop downwardly through the retaining member, a discharge conduit connected to said outlet, and means for supporting the fallen closure above and in spaced relation to said conduit.

References Cited in the file of this patent

UNITED STATES PATENTS

| | | |
|---|---|---|
| 818,264 | Klumpp | Apr. 17, 1906 |
| 2,483,948 | Underwood | Oct. 4, 1949 |
| 2,517,040 | Simon | Aug. 1, 1950 |